Nov. 19, 1935.  H. C. FIELD ET AL  2,021,719
WINDOW ASSEMBLY
Filed July 14, 1933  2 Sheets-Sheet 2
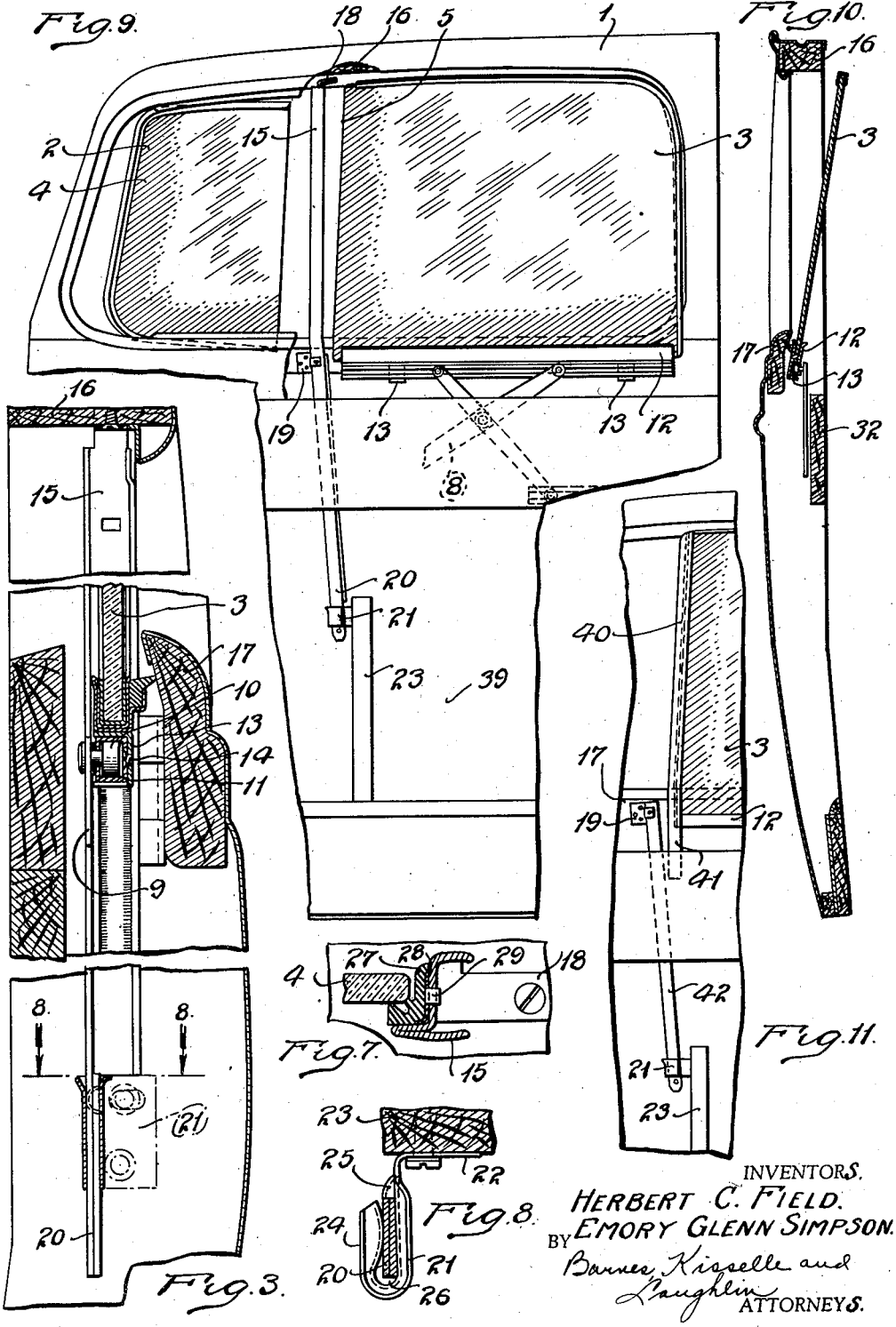
INVENTORS.
HERBERT C. FIELD.
EMORY GLENN SIMPSON.
BY Barnes, Kisselle and Laughlin
ATTORNEYS.

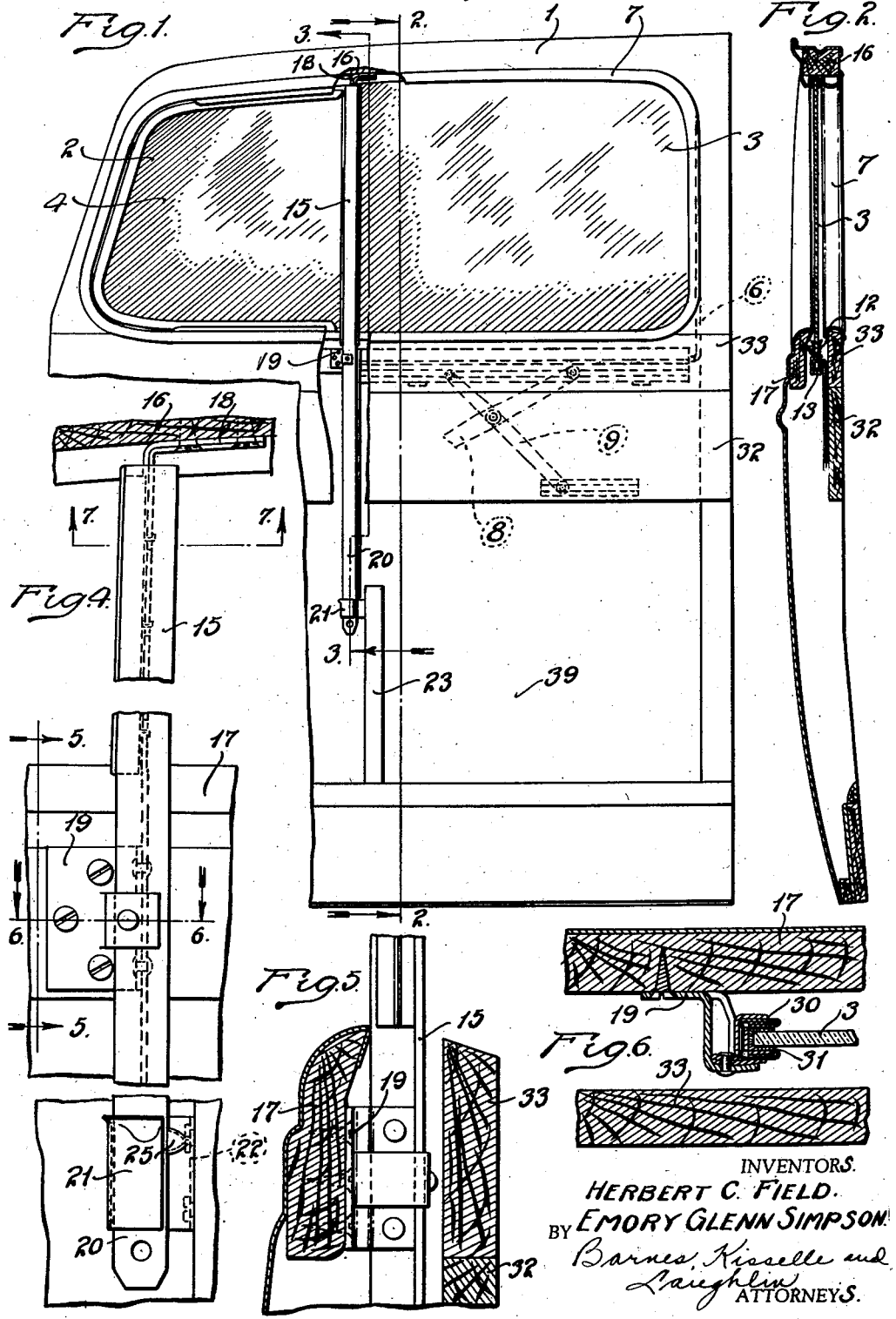
Nov. 19, 1935. H. C. FIELD ET AL 2,021,719
WINDOW ASSEMBLY
Filed July 14, 1933 2 Sheets-Sheet 1
INVENTORS.
HERBERT C. FIELD.
BY EMORY GLENN SIMPSON
ATTORNEYS.

Patented Nov. 19, 1935

2,021,719

UNITED STATES PATENT OFFICE 2,021,719

WINDOW ASSEMBLY

Herbert C. Field and Emory Glenn Simpson, Detroit, Mich., assignors to Ternstedt Manufacturing Company, Detroit, Mich., a corporation of Michigan Application July 14, 1933, Serial No. 680,404

8 Claims. (Cl. 296—48)

This invention relates to a window assembly, and more particularly to a window assembly for an automotive vehicle.

In a vehicle body where the window panel is of the type that can be raised from and lowered into a window well, it is desirable to facilitate the initial assembly of the window panel in the window opening as well as to facilitate the replacement of the window panel. In the replacement of the window panel it is desirable to reduce to a minimum the extent of disassembly of body members and trimming to permit the window panel to be installed.

It is old in the art where the window is guided above the belt and is the full width of the window opening to provide the window regulator with a detachable connection with the lower sash of the window panel which permits the window to be swung inwardly of the body and detached at the belt after the garnish molding and window guide channels have been removed above the belt. Obviously this method can not be pursued where the window panel has either or both of its vertical edges guided below the belt by a sash extension or the like, or where the slidable panel closes only a portion of the window opening and is provided with a channel guideway which extends both below the belt into the window well and above the belt across the window opening thereby dividing the same.

It is the object of this invention to facilitate the assembly, disassembly, or replacement of a slidable window panel where the window has one or both of its edges guided only below the belt by a sash extension or the like or one of its vertical edges guided by a guideway which extends below the belt into the window well and above the belt across the window opening thereby dividing the same. This has been achieved by providing the window assembly with a window guideway which can be moved edgewise of the window to disengage the guideway from the guided edge of the window panel.

It is also an object of this invention to facilitate the initial assembly, disassembly, or replacement of the window guide channel for guide-placement of one of the vertical edges of the window panel both where the guide channel is located entirely within the window well and also where the window guide channel extends both below and above the belt across the window opening thereby dividing the same. This has been achieved by making the window channel detachable at the belt in the first case and both at the belt and at the header in the second case and providing a retaining member for the lower end of the guide into which the guide channel can be fitted from the belt and which retainer permits the guide channel to be swung, when detached at or above the belt, away from the guided edge of the window to disengage the channel from the window.

In the drawings:

Fig. 1 is an inside elevation of a vehicle window assembly with the trimming removed and a portion of the lock board broken away showing the window panel and detachable channel guide in assembled relation.

Fig. 2 is a section along the line 2—2 of Fig. 1.

Fig. 3 is a section along the line 3—3 of Fig. 1.

Fig. 4 is a detail of the detachable window guide channel.

Fig. 5 is a section along the line 5—5 of Fig. 4.

Fig. 6 is a section along the line 6—6 of Fig. 4.

Fig. 7 is a section along the line 7—7 of Fig. 4.

Fig. 8 is a section along the line 8—8 of Fig. 3.

Fig. 9 is a view similar to Fig. 1 showing the channel guide detached at the belt and header, swung edgewise of the window panel, and disengaged from the guided edge of the panel.

Fig. 10 is a section similar to Fig. 2 showing the panel being either swung into or out of the window opening after the channel guide has been detached and disengaged from the guided edge of the window panel.

Fig. 11 is a fragmentary view similar to Fig. 9 showing a modified form of the invention where the guide channel extends below the belt only.

Referring more particularly to the drawings there is shown by way of description a front door 1 of a vehicle body having a window opening 2 which is provided with a composite closure including a sliding panel 3 and a pivoted panel 4. This window assembly is shown and claimed in copending application, Serial No. 644,622.

The sliding panel 3 has the upright edges 5 (Fig. 9) and 6 (Fig. 1). The vertical edge 6 is guided in the usual manner, preferably in a channel guideway mounted on the door pillar and provided with a pile weatherstrip insert. The inside of the window opening is provided with a removable garnish molding 7 which, in this instance, extends completely around the periphery of the opening.

The sliding panel 3 is arranged to be raised and lowered by any suitable window regulator which is detachable at the belt. In the form shown the regulator comprises a pair of crossed-levers 8 and 9 which are pivoted together at their intersection. The levers are provided at their upper ends with the studs 10 which carry, and travel back and forth in, the runway 11 as the window is raised and lowered. The runway normally can not be detached from the studs 10 when the regulator is assembled in the window well. The runway 11 likewise serves as an attaching plate for connecting the regulator to the window. To this end the lower sash 12 of the window is provided with a pair of spaced brackets 13 which are arranged to receive the runway 11. The runway 11 is secured to the brackets 13 by the screws 14.

The vertical edge 5 of the panel 3 is guided by a channel guideway 15 which in this instance, by way of example, extends not only from the belt downwardly into the window well 39 but also above the belt across the window opening thereby dividing the window opening into two portions, one of which is closed by the sliding panel 3 and the other by the swinging panel 4. The channel guide 15, as shown, is inclined somewhat rearwardly from the bottom to the top of the window opening, that is, from the belt to the header. This rearward inclination from the bottom to the top of the window channel is essential because if the portion of the channel 15 extending across the window opening were perpendicular it would appear to be leaning forwardly from bottom to top which is an optical illusion created by the rearward inclination from belt to header of the front edge of the window opening which in this case is the rearwardly inclined door pillar. The channel 15 is detachably secured to the header 16 and the belt rail 17. Hence, the channel 15 has fixed thereto a bracket 18 which may be screwed or otherwise suitably detachably secured to the header 16 and is provided at the belt with a bracket 19 which likewise may be screwed or otherwise suitably detachably secured to the belt rail 17. The lower end 20 of the channel 15 is removably secured in the window well so that when the brackets 18 and 19 are detached, the channel 15 can be moved edgewise of the glass, that is, in the plane of the glass, to disengage the channel 15 from the edge 5 of the panel 3. To this end the window well has mounted therein the socket 21.

The socket 21 preferably comprises a strip of spring metal having an outwardly turned edge 22 which is screwed or otherwise suitably secured to a support 23 which is permanently mounted in the window well. The strip in turn is bent back upon itself as at 24 to form a spring socket for reception of the lower end 20 of the channel member 15. The socket member 21 has pressed therein a lug 25 which prevents the lower end 20 of the channel member 15 from slipping sidewise out of the socket 21. The lower end 20 of the channel member 15 may be removed from the socket 21 by drawing the channel member upwardly. The side edges of the lower end 20 of the channel member are provided with sufficient clearance as at 26 with the socket to permit the channel member 15 to tilt or swing edgewise of the window panel when it is desired to disengage the channel from the window panel. At the same time the return bent portion 24, being of spring metal, yieldably grips the lower end of the channel and prevents rattling.

The channel member 15 is provided on the one side with a weatherstrip 27 for sealing the edge of the swinging panel 4. The weatherstrip 27 may be vulcanized to a copper plated strip of metal 28 provided with a plurality of lugs 29 which are passed through suitable openings in the base of the channel member 15 and then clinched over (Fig. 7) thus securing the weatherstrip to the channel. The inside of the channel is provided with a metal channel window guideway 30 which has secured therein a suitable weatherstrip lining such as the pile lining 31 for guiding and weatherproofing the vertical edge 5 of the sliding panel 3 (Fig. 6).

The guide channel 15 and window panels 3 and 4 are usually assembled in the window opening after the door has been trimmed, the window regulator having been installed in the window well prior to the trimming. As shown in Fig. 2, the lock board comprises a lower section 32 and an upper section 33. Prior to installing the window panel the trimming is installed only to the upper edge of the lower section 32 of the lock board. At this time the channel member 15 can be placed into the window well at the belt and moved downwardly until the lower end 20 engages in the socket 21. The sliding panel 3 can now be tilted into the window opening, as shown in Fig. 10, and the brackets 13 brought into engagement with the runway 11, whereupon the screws 14 (Fig. 3) can be turned down to secure the runway 11 to the brackets 13 and thus attach the regulator to the sliding panel 3. Thereafter the channel member 15 can be swung edgewise to the right as viewed in Fig. 9 into engagement with the edge 5 of the panel 3 and the brackets 18 and 19 secured respectively to the header and the belt as shown in Fig. 1. Then the upper section 33 of the lock board can be secured in position, the trimming drawn up over this section 33 of the lock board and the assembly completed by the installation of the garnish molding 7. The swinging panel 4 may be assembled in the window opening either before or after the slidable panel.

If it is desired to remove the sliding panel 3, it is only necessary to lower the window panel 3, remove the garnish molding 7 and the window guide channel and weatherstrip along the vertical edge 6 and top edge of the panel, and then detach the brackets 18 and 19, swing the channel member 15 edgewise of the glass panel 3 or to the left, as shown in Fig. 9, to disengage the channel from the vertical edge 5 of the panel 3. The trim is now pulled down to the upper edge of the lower section 32 and the upper section 33 of the lock board is removed to permit access to, and removal of, the screws 14, the panel 3 can now be tilted inwardly of the window opening as shown in Fig. 10 and disengaged from the regulator and then lifted out of the window opening.

In the modified form shown in Fig. 11, the sliding panel 3 is in all respects similar to that shown in the principal form of the invention except that its forward edge 5 is provided with a sash 40 in the form of an H-channel, shown and described in the above mentioned copending application. The sash 40 extends below the lower sash 12 to form a sash extension 41 which guides the forward edge of the window below the belt when in raised position. In this form of the invention the window is guided below the belt only by a guide channel 42 which is likewise removably secured in a socket 21 identical with that shown in the principal form of the invention. The guide 42 is detachably secured to the belt rail 17 by a bracket 19 similar to that shown in the principal form of the invention. In the modified form of the invention the sliding window panel 3 is removed for installation in the same fashion as the sliding panel of the principal form. After the bracket 19 has been detached from the belt rail the guide channel 42 can be swung edgewise of the window or pivoted to the left, as shown in Fig. 11, to disengage the guide 42 from the sash 40 and sash extension 41, thus permitting the window panel 3 to be swung out or tilted into the window opening as pointed out in the description of the principal form of the invention.

We claim:

1. A window assembly for an automotive vehicle or the like having a window opening and a window well therebelow, comprising in combination a window panel for the said opening and arranged to retreat into the said well, a guideway for one of the upright edges of the well positioned along one of the sides of the window well, and a guide for the other upright edge of the said window panel positioned in the said well for guiding said window panel into the well and supporting the panel in retreated position in the well and having a detachable connection with the upper portion of the window well and a member positioned in the window well for pivotally supporting the said guide at its lower end, whereby the said guide can be detached and shifted sidewise in the window well away from the upright edge of the panel to disengage the same from the edge of the window panel to permit removal of the panel from the window opening.

2. A window assembly for an automotive vehicle or the like having a window opening and a window well therebelow, comprising in combination a slidable window panel for the said opening and arranged to retreat into the window well, a guideway for one of the upright edges of the window panel secured along one of the sides of the window well, a shiftable guide for the other upright edge of the said window panel positioned in the said well, a detachable connection for the said shiftable guide at the belt, and a socket for receiving the lower end of the said guide whereby the said guide can be detached at the belt and pivoted in the said socket while in the said window well to disengage the said guide from the edge of the window panel to permit removal of the panel from the window opening.

3. A window assembly for an automotive vehicle or the like having a window opening and a window well therebelow comprising in combination a window panel for the said opening, a window regulator positioned in the window well having a detachable connection with the lower edge of the window panel for raising and lowering the said window panel, a guideway for one of the upright edges of the window panel along one of the sides of the window well, and a shiftable guide for the other upright edge of the window panel positioned in the said window well, the said shiftable window guide having a detachable connection with the window well whereby the same can be detached and shifted in the window well to disengage the same from the edge of the window panel to permit the window panel to be removed from the window opening when detached from the regulator.

4. A window assembly for an automotive vehicle or the like having a window opening and a window well therebelow, comprising in combination a window panel for the said opening, a window regulator positioned in the window well having a detachable connection with the lower edge of the window panel for raising and lowering the said window panel, a guideway for one of the upright edges of the window well positioned along one of the sides of the window well, and a shiftable guide for the other upright edge of the said window panel positioned in the said well and having a detachable connection with the upper portion of the window well whereby the said guide can be detached and shifted sidewise in the window well to disengage the same from the edge of the window panel to permit removal of the panel from the window opening when detached from the regulator.

5. A window assembly for an automotive vehicle or the like having a window opening and a window well therebelow, comprising in combination a slidable window panel for the said opening and arranged to retreat into the window well, a window regulator positioned in the window well having a detachable connection with the lower edge of the window panel for raising and lowering the said window panel, a guideway for one of the upright edges of the window secured along one of the sides of the window well, a shiftable guide for the other upright edge of the said window panel positioned in the said well, and a detachable connection for the said shiftable guide at the belt, and a socket for receiving the lower end of the said guide whereby the said guide can be detached at the belt, and pivoted in the said socket edgewise in plane of the window in the said window well to disengage the said guide from the edge of the window panel to permit removal of the panel from the window opening when detached from the regulator.

6. A window assembly for an automotive vehicle or the like having a window opening and a window well therebelow comprising in combination a slidable window panel for the said opening and arranged to retreat into the said well, a guideway for one of the upright edges of the window panel secured along one of the sides of the window well, and a shiftable guide for the other upright edge of the window panel extending below the belt into the said window well and above the belt across the said window opening to divide the same, the said shiftable window guide having detachable connections at the upper part of the window well and along the upper edge of the window opening whereby the shiftable window guide can be detached and shifted sidewise in the window opening and window well to disengage the same from the edge of the window panel to permit removal of the panel from the window opening when detached from the regulator.

7. A window assembly for an automotive vehicle or the like having a window opening and a window well therebelow comprising in combination a slidable window panel for the said opening, a window regulator positioned in the window well having a detachable connection with the lower edge of the said panel for raising and lowering the same, a guideway for one of the upright edges of the window panel secured along one of the sides of the window well, a shiftable guide for the other upright edge of the window panel extending below the belt into the window well and above the belt across the window opening, the said shiftable window guide having detachable connections with the window well at the belt and with the window header, and a socket for receiving the lower end of the said guide whereby the said guide may be detached at the belt and the header and pivoted about the socket in the window well to disengage the guide from the edge of the window panel to permit the panel to be removed from the window opening when disconnected from the window regulator.

8. A window assembly for an automotive vehicle or the like having a window opening and a window well therebelow comprising in combination a slidable window panel for the said opening, a window regulator positioned in the window well having a detachable connection with the lower edge of the said panel for raising and lowering the same, a guideway for one of the upright edges of the window panel secured along one of the sides of the window well, a shiftable guide for the other upright edge of the window panel extending below the belt into the window well and above the belt across the window opening, the said shiftable window guide having detachable connections with the window well at the belt and with the window header and inclined rearwardly above the belt from the bottom to the top of the window opening, and a socket for receiving the lower end of the said guide whereby the said guide may be detached at the belt and the header and pivoted about the socket in the window well to disengage the guide from the edge of the window panel to permit the panel to be removed from the window opening when disconnected from the window regulator.

HERBERT C. FIELD.
EMORY GLENN SIMPSON.